May 12, 1959

M. E. BOURNS 2,886,677

DIGITAL READOUT DEVICE

Filed Nov. 10, 1955

M. E. BOURNS 2,886,677

DIGITAL READOUT DEVICE

Filed Nov. 10, 1955

United States Patent Office 2,886,677
Patented May 12, 1959

2,886,677

DIGITAL READOUT DEVICE

Marlan E. Bourns, Riverside, Calif.

Application November 10, 1955, Serial No. 546,140

6 Claims. (Cl. 201—48)

This invention relates to a new and improved digital readout device.

In many applications, it is desired to measure electrical quantities such as voltage, resistance or voltage ratio in a digital form. In particular in the calibration of potentiometers it is desired to measure the position of the wiper on the potentiometer being calibrated in terms of voltage ratio. The devices of this invention are intended to be utilized for making measurements such as these. They may be either servo-operated or manually adjusted as desired.

It is a broad object of this invention to provide digital readout devices of the category indicated in the preceding discussion which are comparatively simple to construct and which are reliable in operation. Further objects of this invention as well as many advantages of it will be apparent to those skilled in the art to which the invention pertains from an analysis of the remainder of this description and the accompanying drawings, in which.

Figure 1:
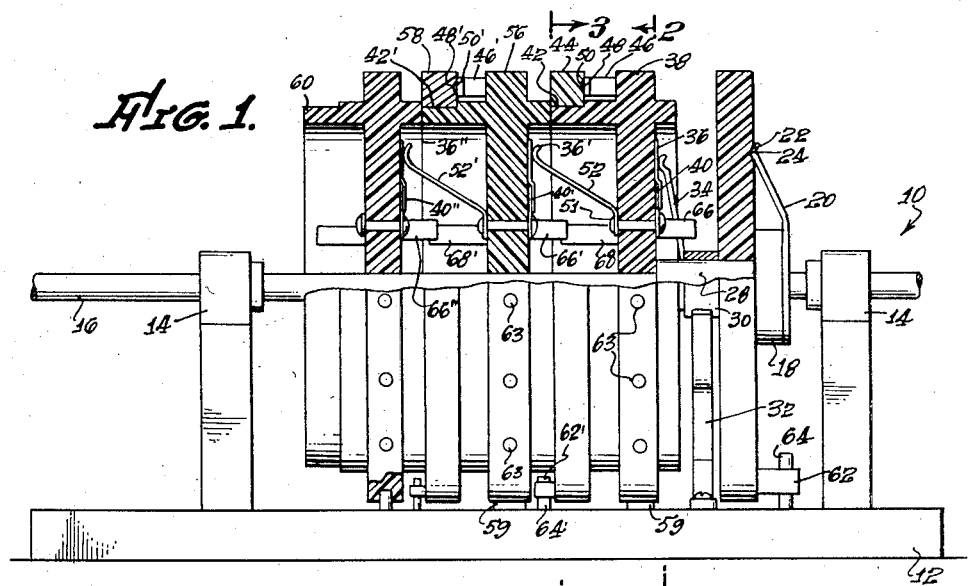
Fig. 1 is a side elevational view of a digital readout device of this invention, this view being partially in section so as to reveal certain constructional details.

In all figures of the drawings, like numerals are used to designate like parts whenever convenient for purposes of illustration and explanation. No attempt is made in the drawings to indicate any precise commercial embodiment of the invention drawn to scale. Instead, the drawings are primarily intended to illustrate preferred constructional details in a manner in which the basic principles of the invention may be readily understood. Obviously, a number of different modifications in the constructions shown may be made without departing from the essential features herein explained.

The appended claims are believed to provide a complete summary of the various inventive concepts present within this application. It may be stated, however, by way of a summary which will help to understand the nature of the invention that digital devices as herein described include: a shaft which is used to actuate the entire device; a spring detent attached to this shaft so as to rotate therewith; a first readout member rotatably positioned around this shaft, said first readout member including means adapted to be engaged by the spring detent; a first support member positioned around the shaft; a detent attached to the first support member so as to project therefrom; a second readout member rotatably positioned around said shaft, this second readout member including means adapted to be engaged by the detent attached to the support member; and means for preventing complete rotation about the shaft of the first readout member. The precise nature of this invention is best more fully explained by direct reference to the accompanying drawings.

In Fig. 1 of the drawings there is shown a digital readout device 10 of the invention which includes a base 12 having attached thereto bearings 14 which are adapted to hold a shaft 16 used to actuate the entire device. Attached to this shaft so as to move with it is a collar 18 upon which there is secured a spring detent 20. This detent is designed so that a small projection 22 on it will fit within any of a series of 10 depressions 24 on a first readout member 26 rotatably positioned about the shaft 16. This first readout member is preferably formed of a non-conductive material. A nonconductive cylinder 28 projects from the collar 18 through the center of the member 26. About this cylinder there is located a common metal slip ring 30 which is engaged by a spring contact brush 32. The brush 32 is mounted upon the base 12 in such a manner that it may be connected to a suitable source of electrical current during the use of the device 10.

From the slip ring 30 there projects a resilient contact arm 34 in such a manner that this contact arm engages any of a series of contact members 36 placed upon a first support member 38. This first support member is also rotatably positioned about the shaft 16; it is preferably formed of a non-conductive material so that on its surface adjacent to the first readout member 26 there can be positioned an arcuate resistance layer 40 which is adapted to be divided up into nine equal segments (or resistors) of equal resistance by the contact members 36. It will be seen from an examination of Fig. 2 of the drawings that ten of these contact members are provided with the preferred construction of the invention corresponding to ten different positions of the first readout member 26 with respect to the base 12.

Rotatably mounted about the shaft 16 upon the first support member 38 within a groove 42 formed in this first support member is a second readout member 44. A spring detent 46 having a projection 48 formed thereon is attached to the first support member in such a manner that this projection 48 is adapted to engage any of ten different depressions 50 formed on the second readout member 44.

Figure 3:
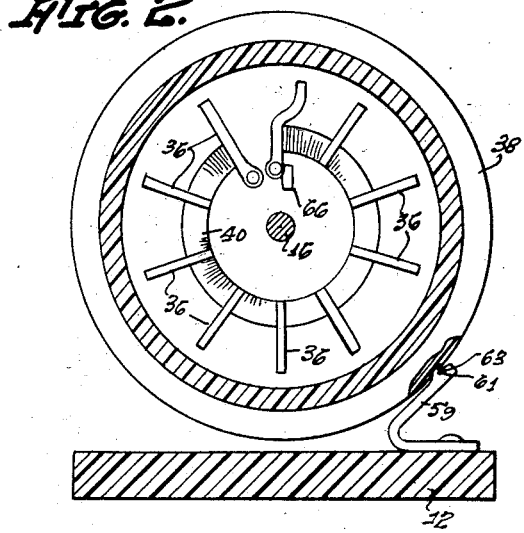
Fig. 3 is a cross sectional view taken at line 3—3 of Fig. 1.
Figure 2:
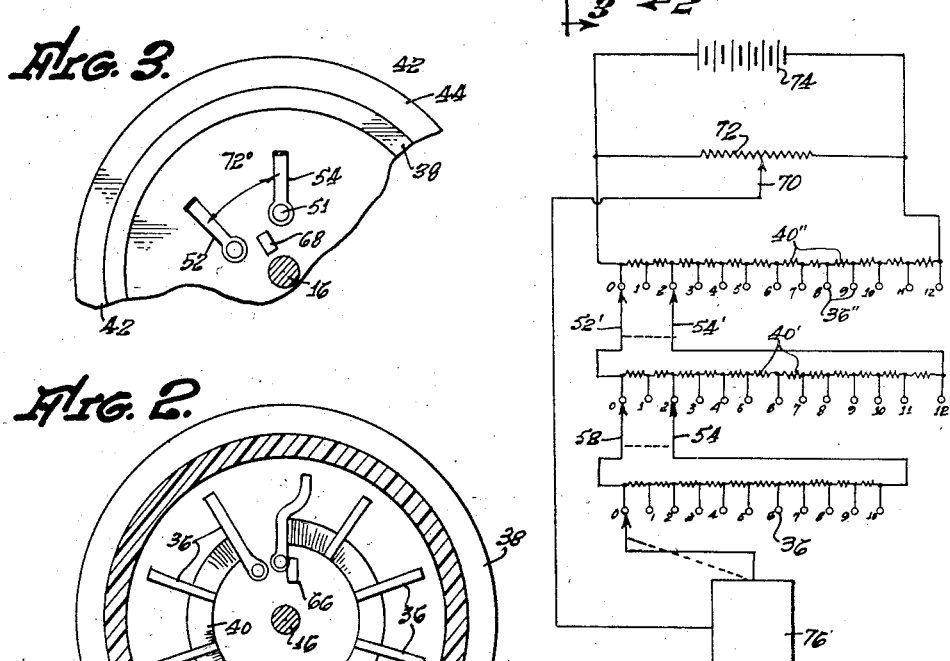
Fig. 2 is a cross sectional view taken at line 2—2 of Fig. 1.

From an examination of Figs. 1, 2 and 3 of the drawings it will be seen that the contact members 36 at the ends of the resistance layer 40 are connected by means of small pins 51 projecting through the first support member 38 to resilient contact arms 52 and 54 which project from the first support member 38 so as to engage contact member 36' formed upon a second support member 56. The two contact arms 52 and 54 are preferably formed so as to engage contact members 36' which are removed from one another by one contact member. On this second support member 56 the contact members 36' overlay a resistance layer 40' of the category previously described, and twelve of these contact members 36' are provided for reasons which will be explained later.

A third readout member 58 is rotatably supported about the shaft 16 upon the second support member 56 in the same manner in which the second readout member 44 is supported upon the first support member 38. The structure of the third readout member 58 is identical with that of the second readout member 34; the structure of the second support member 56 is identical with the structure of the first support member 38 except for the difference indicated in the preceding description.

From the second support member 56 there project contact arms 52' and 54' similar to the contact arms 52 and 54 described. These contact arms 52' and 54' are intended to engage contact members 36" formed so as to overlie portions of a resistance layer 40" of the category previously described upon the surface of a third support member 60. For convenience of manufacture and assembly, this third support member is of substantially identical construction to the second support member 56.

During the operation of the device 10 as the shaft 16 is turned the detent 20 causes the first readout member 26 to rotate along with this shaft until such time as a projection 62 upon the first readout member hits against a pin 64 attached to the base 12. At this point the detent 20 will be disengaged from the first readout member 26. At this point the shaft 16 continues to rotate in the same direction. As the shaft 16 is rotated the contact arm 34 is rotated along contact members 36 as indicated previously. This rotation occurs until the contact arm 34 hits against a pin 66 projecting from the first support member 38. When this occurs the engagement of the pin 66 by the contact arm 34 causes the first support member 38 to rotate. The rotation of the first support member 38 is transmitted to the second readout member 44 by means of the detent 46 until such time as a projection 62' upon the second readout member 44 hits against a pin 64' attached to the base 12.

When the first support member 38 is rotated sufficiently a pin 68 on it hits against another pin 66' formed upon the second support member 56 causing the second support member 56 to rotate with the first support member 38. This rotation of the second support member is transmitted to the third readout member 58 in the same manner in which the rotation of the first support member 38 is transmitted to the second readout member 44. Undesired rotation of the support members 38 and 56 such as caused by friction is prevented by spring detents 59 on the base 12 so that projections 61 on these detents engage any of a series of ten depressions 63 in these support members.

The actual operation of the digital readout device 10 involves a number of reversals of rotation of the shaft 16 until such time as a final value is obtained. This will be realized from the actual circuit involved in the operation of the device 10 indicated in Fig. 4 of the drawings. Here it is seen that when current is supplied to the contact members 36" at the end of a resistance layer 40" upon the third support member 60 and when current is supplied to the contact arm 34 the device 10 is employed as a potentiometer. In the application shown in Fig. 4 of the drawings the adjustable readout device 10 is used to determine the position of a wiper 70 upon an unknown potentiometer 72. This potentiometer is connected in parallel with the end contact members 36" of the device 10 to a battery 74, and the wiper 70 is connected to a comparison device 76 which is used to electrically turn the shaft 16.

Figure 4:
Fig. 4 is a diagrammatic view of the electrical circuit employed with the device shown in Fig. 1.

When the device 10 is adjusted to an initial "zero" reading corresponding to the wiper of a potentiometer being at one end of the resistance element in an instrument of this category the contact arms in this device are as indicated in Fig. 4. As the comparison device 76 is caused to operate the shaft 16 is turned in a direction so as to tend to move the various parts as previously indicated in a sequential manner so as to initially move the contact arm 34 along the "row" of contacts 36 to the end of this row, then to move the contact arms 52 and 54 along the "row" of contacts 36' to the end of this row, and finally to move the contact arms 52' and 54' along the "row" of contacts 36" to the end of this row. From a consideration of the various figures of the drawing described it will be realized that as the contact arm 34 is rotated and as the support members 38 and 56 are rotated with respect to one another the resistance between the contact arm 34 and the two contact members 36" upon the third support member 60 changes in substantially the manner in which a potentiometer operates as the wiper on such an instrument is adjusted. However, it should be emphasized that a sequential operation is involved so that either a single contact arm or a set of two contact arms located at a fixed distance with respect to one another is being moved with respect to a single series of contact members connecting what amounts to a series of resistors at any one time.

With the preferred embodiment of the invention all of the resistances between the contact members on any one support member are equal. Further the values of these resistances on the various supports are proportioned with respect to one another so that when the resistance of the resistance layer 40' between two of the contact members 36' which are separated by one contact member 36' upon the second support 56 is connected in parallel with the resistance layer 40. The effective resistance of this arrangement is equal to the resistance between any two adjacent contact members 36' on the second support 56. The same proportions are used with respect to the value of the resistances upon the second and third support members.

For a complete understanding of the operation of the device it is necessary to give the values of the electrical resistances between the contact members 36, 36' and 36" upon each of the three separate support members. Thus, in one modification of the invention all of the resistances between the contact members 36 are preferably, on the first support member, 8 ohms; upon the second support member 40 ohms; and upon the third support member 200 ohms. Other values can, of course, be utilized.

In practice the comparison device 76 is caused to operate when there is an unbalance in what amounts to a bridge circuit formed by the potentiometer 72 and the device 10, and rotation in a single direction resulting from the operation of the comparison device 76 is continued initially causing adjustment of the device past the point where this bridge circuit would be in balance. As soon as this point is past the comparison device 76 causes the shaft 16 to rotate in the opposite direction from the initial rotation causing the various parts to move in the expected manner effecting adjustment of the device 10 past the point where this circuit would be in balance. The shaft rotation is reversed in this manner as many times as are necessary to gradually adjust the device 10 to a point where the positions of the readout members indicate the location of the wiper 70 on the potentiometer 72. The wiper 70 can be located so that the shaft 16 need be rotated in only a single direction, but this is not the usual circumstance.

It should be noted that with the device 10 the various readout members do not rotate constantly, but are held by the means indicated so that they do not rotate except when the contact arms to which they correspond are being moved along a "row" of contact members connected to a single resistance layer. Thus, the readout member 26 only rotates along with the shaft 16 when the contact arm 34 is not hitting against the pin 66 and the readout member 44 only rotates along with the shaft 16 when the pins 66 and 68 are not in engagement. With the construction shown the numerals (not shown) are placed on the outside of each of the readout members so that the positions of the readout members can be determined visually. Electrical means such as slip rings attached to contact arms which engage contacts placed upon auxiliary supports, current being supplied to these slip rings by brushes, can be used to determine the positions of these readout members by causing lights to light, etc.

Figure 6:
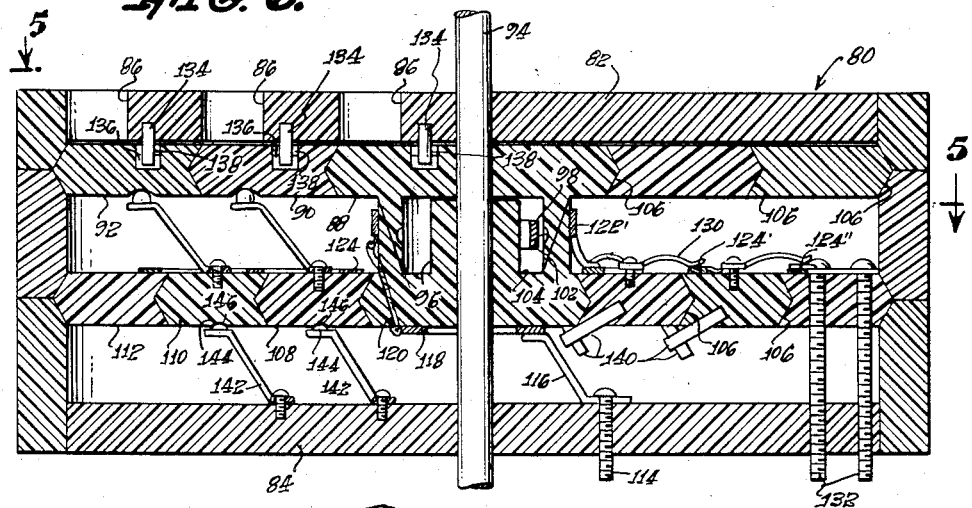
Fig. 6 is a cross sectional view taken at line 6—6 of Fig. 5.
Figure 5:
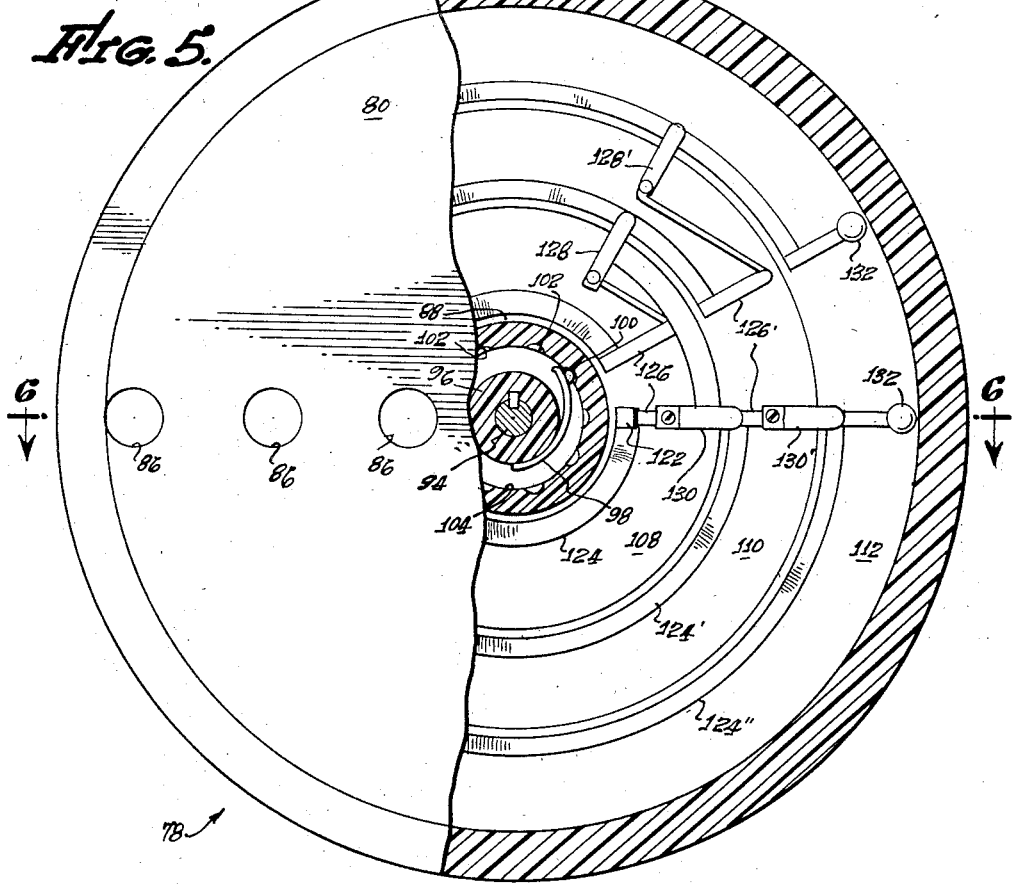
Fig. 5 is a top view of a modified digital readout device of this invention partially in section along line 5—5 of Fig. 6 of the drawings.

In Figs. 5 and 6 of the drawing there is shown a modified digital readout device 78 which operates in the same manner as the device 10 but which differs from the device 10 in that it is of a flat pancakelike shape and form. This modified device includes a segmental housing 80 having a top 82 and a bottom or base 84. Within the top 82 there are provided a series of openings 86 so that numerals (not shown) upon first, second and third readout members 88, 90, and 92 having a disc or wheel-like shape indicating the positions of these members may be readily determined by visual inspection. A shaft 94 projects through the center of the device 78. Between the top 82 and the bottom 84 there is secured to this shaft a nonconductive member 96 which, in turn, carries a spring detent 98 having a projection 100 formed thereon which is adapted to engage any of a series of 10 depressions 102 formed in an interior cavity 104 between the first readout member 88 and the member 96. These two members fit together as shown so that a conical surface on each member rests against a correspondingly shaped surface on the other.

As is best seen in Fig. 6 of the drawings the three readout members 88, 90 and 92 are each provided with a pointed exterior surface 106, each of these surfaces being adapted to be held within a conforming interior surface on either the next readout member of the housing. Positioned between the top 82 and the bottom 84 of the housing 80 so as to be spaced from the readout members 88, 90 and 92 and from the bottom 84 are first, second and third support members 108, 110 and 112. These support members are rotatably held in position by pointed exteriors such as the exteriors 106 previously described fitting in correspondingly shaped portions of the next adjacent support member or of the housing 80. A similar exterior surface on the member 96 engages a correspondingly shaped interior on the support member 108.

Attached to the bottom 84 is a terminal 114 having secured thereto a contact arm 116 which is adapted to engage a slip ring 118 formed upon the first readout member 88. A small wire 120 serves to connect this slip ring 118 to a contact arm 122 corresponding to the contact arm 34 previously described. This contact arm 122 is designed so as to engage an arcuate resistance layer upon the first support member 108 as the first readout member 88 is rotated. The ends of the resistance layer 124 are connected by small connecting strips 126 to contact arms 128 and 130 corresponding to the contact arms 52 and 54 previously described. These contact arms bear against different portions of an arcuate resistance layer 124' formed upon the second support member 110. This second support member is provided with connecting strips 126' and contact arms 128' which engage a third arcuate resistance layer 124" on the third support member 112. The ends of this second resistance layer 124" are connected to terminals 132 which are used in connecting the device 78 into an electrical circuit as previously indicated.

An important feature of the instant invention lies in the use of "means for preventing rotation" of the category described in connection with the device 10. In the readout device 78 these means take the form of pins 134 engaging ridges 136 in grooves 138 on the readout members 88, 90 and 92. Also, pins 140 are provided upon the member 96 and the first support member 108 and the second support member 110 as indicated for the same purpose as the pins 66 and 68 in the device 10. Undesired rotation of the first and second support members is prevented by spring detents 142 having projections 144 formed thereon engaging either of a series of ten depressions 146 formed upon the first and second support member 108 and 110. The second and third readout members 90 and 92 are caused to rotate with the first and second support members 108 and 110 by means of other spring detents 142 engaging depressions 146 upon these readout members in the manner indicated.

For simplicity of construction it is preferred to form all parts of the digital readout device 78 out of a nonconductive resinous material such as, for example, a phenolic resin, except those parts which by their inherent nature must be conductive. When non-conductive materials of this category are used the various resistance layers and conducting strips may be conveniently applied by printed circuit techniques. While no contact members have been shown in the device 78 which are designed to be engaged by contact arms 128 or 130 or the contact arm 116, it is to be understood that such contact means may be employed. When such contact means are employed it is possible to substitute for the resistance layers shown precision wire wound or other resistors mounted upon the support members. Such substitution can, of course, be made with the device 10. It is to be understood that the resistance values of segments of the resistance layers 124, 124' and 124" and the spacing of the contact arms 128 and 130 of the device 78 correspond to the resistance values and spacing indicated with respect to the corresponding parts of the readout device 10.

A number of other modifications of this category can be made without departing from the essential nature of the invention herein described. While it is primarily intended that the constructions of this invention be utilized with the common system of numbers based upon the number ten, nevertheless, this device can be used where it is desired to convert rotation to binary or other numbers by appropriate modification of an obvious nature. Also, it is possible to connect the various support members and readout members described as previously indicated through auxiliary contacts and contact arms so as to utilize such constructions for a wide variety of computer and other applications such as are involved in turning lights on and off to indicate various positions. Because of the fact that a number of modifications such as are indicated can be made in manufacturing devices operating as herein described this invention is to be limited only by the appended claims.

I claim:

1. A new and improved digital readout device which comprises: a base; a shaft rotatably supported by said base; a first readout wheel rotatably mounted on said shaft; a first spring detent secured to said shaft so as to rotate therewith; means formed on said first readout wheel adapted to coact with said first spring detent so as to cause said first readout wheel to rotate at the same speed as said shaft; stop means located on said first readout wheel and said base for limiting the rotation of said first readout wheel; a slip ring secured around said shaft so as to rotate therewith; a brush attached to said base so as to engage said slip ring; a first resilient contact arm attached to said slip ring so as to project therefrom; a first support wheel rotatably mounted on said shaft adjacent to said first readout wheel; a first series of resistors mounted on said first readout wheel; a first series of contacts connected to said resistors mounted on said first support wheel adjacent to said first readout wheel, said first series of contacts being arranged so that said first contact arm engages contacts of said series during rotation of said first readout wheel; stop means located on said first support wheel so as to be engaged by said first contact arm in order to cause said first support wheel to be rotated when engaged by said first resilient contact arm; a second readout wheel rotatably mounted on said first support wheel; a second spring detent mounted on said first support wheel; means formed on said second readout wheel adapted to coact with said second spring detent so as to cause said second readout wheel to rotate at the same speed as said first support wheel; stop means located on said second readout wheel and said base for limiting the rotation of said second readout wheel; a third spring detent secured to said base; means formed on said first support wheel adapted to be engaged by said third spring detent so as to cause said first support wheel to remain stationary during rotation of said shaft except when said first resilient contact arm engages said stop means formed on said first support wheel; a second support wheel mounted on said shaft adjacent to said first support wheel; a second series of resistors mounted on said second support wheel; a second series of contacts connected to said second series of resistors and mounted on said second support wheel adjacent to said first support wheel; and first contact arm means connected to said first series of resistors mounted on said first support wheel so as to project therefrom engaging said second series of contacts on said second support wheel.

2. A digital readout device as defined in claim 1 wherein: said second support wheel is rotatably mounted on said shaft, and digital readout device including: a third readout wheel rotatably mounted on said second support wheel; a fourth spring detent mounted on said second support wheel; means formed on said third readout wheel adapted to coact with said fourth spring detent so as to cause said third readout wheel to rotate at the same speed as said second support wheel; a fifth spring detent secured to said base; means formed on said second support wheel adapted to be engaged by said fifth spring detent so as to cause said second support wheel to remain stationary during rotation of said first support wheel except when force is applied to said second support wheel tending to directly cause rotation of said second support wheel; stop means formed on said first and said second support wheels for transmitting force from said first to said second support wheel in order to cause rotation of said second support wheel; a third support wheel mounted on said shaft adjacent to said second support wheel; a third series of resistors mounted on said third support wheel; a third series of contacts connected to said third series of resistors and mounted on said third support wheel adjacent to said second support wheel; and second contact arm means connected to said second series of resistors mounted on said second support wheel so as to project therefrom engaging said third series of contacts on said third support wheel.

3. A digital readout device as defined in claim 2 including: means securing said third support wheel against rotation with respect to said base.

4. A digital readout device as defined in claim 3 wherein said first and said second contact arm means each comprises two resilient contact arms, said contact arms of each of said contact arm means being spaced from one another so as to engage alternate contacts of said second and said third series of contacts, respectively.

5. A digital readout device which includes a shaft, a spring detent attached to said shaft so as to rotate therewith, a first readout member rotatably positioned around said shaft, said member including means adapted to be engaged by said detent so as to cause said first readout member to rotate with said shaft, a first support member rotatably mounted around said shaft, a second detent spring attached to said first support member so as to project therefrom, a second readout member rotatably mounted upon said first support member, said second readout member including means adapted to be engaged by said second spring detent, and means for preventing complete rotation of said readout members about said shaft.

6. A digital readout device comprising, in combination, a first readout member supported for rotation, a plurality of support members arranged coaxially with respect to said first readout member, the end support member remote from said first readout member being stationary and the others of said support members being rotatable with respect to one another, other readout members rotatably associated with each of said rotatable support members, limit stop means for limiting the rotation of each of said readout members to a predetermined angular travel in either direction, yieldable driving means on each of said rotatable support means for rotating its associated readout member therewith, each of said support members having a plurality of equally spaced contacts disposed in a circular arc of included angle equal to said predetermined angular travel of said readout members, equal value resistors connected serially between said contacts, the end contacts of each of said rotatable support members being connected to wipers engaging the contacts of the next adjoining support member, the end contacts of said one stationary support member being connected to opposite ends of the resistance element of a potentiometer, driving means on each of said rotatable support members engageable with companionate means on the next adjoining support member to rotate the latter in either direction, said last-named driving means being operable to permit relative rotation of the associated support member with respect to said adjoining support member through an angular distance equal to said predetermined angular travel of said readout members, a rotatable driving member having a wiper engaging the contacts of the rotatable support member adjacent said first readout member, said rotatable driving member having a lost-motion driving connection with said adjacent rotatable support member whereby the latter can be driven in either direction, said lost-motion driving connection permitting relative rotation between said rotatable driving member and said adjacent rotatable support member through an angular distance equal to said predetermined angular travel of said readout members, means for yieldingly driving said first readout member in the same direction as said rotatable driving member, and a comparison device electrically connected to the wiper of said potentioneter and to the wiper of said rotatable driving member, said comparison device being operable to drive said rotatable driving member and said first readout device alternately in one direction and then the other.

References Cited in the file of this patent
UNITED STATES PATENTS

| | | |
|---|---|---|
| 597,470 | Norden | Jan. 18, 1898 |
| 2,670,422 | Baum et al. | Feb. 23, 1954 |